US008180587B2

(12) United States Patent
Cross, Jr. et al.

(10) Patent No.: US 8,180,587 B2
(45) Date of Patent: May 15, 2012

(54) SYSTEM FOR BROKERING FAULT DETECTION DATA

(75) Inventors: Elfido Cross, Jr., Austin, TX (US); Sam H. Allen, Jr., New Braunfels, TX (US); Michael R. Conboy, Austin, TX (US)

(73) Assignee: GlobalFoundries Inc., Cayman Islands (KY)

( * ) Notice: Subject to any disclaimer, the term of this patent is extended or adjusted under 35 U.S.C. 154(b) by 2456 days.

(21) Appl. No.: 10/094,550

(22) Filed: Mar. 8, 2002

(65) Prior Publication Data

US 2003/0171885 A1    Sep. 11, 2003

(51) Int. Cl.
*G01N 37/00*  (2006.01)
*G06F 11/30*  (2006.01)

(52) U.S. Cl. .......................................... 702/82; 702/185
(58) Field of Classification Search .................... 702/82, 702/183–185; 700/108, 110; 714/25, 100
See application file for complete search history.

(56) References Cited

U.S. PATENT DOCUMENTS

| | | | |
|---|---|---|---|
| 5,485,759 A | 1/1996 | Goff et al. ..................... 73/865.9 |
| 5,560,775 A | 10/1996 | Conboy et al. ................ 118/500 |
| 5,651,798 A | 7/1997 | Conboy et al. ................ 29/25.01 |
| 5,658,123 A | 8/1997 | Goff et al. ..................... 414/786 |
| 5,751,581 A | 5/1998 | Tau et al. ................. 364/468.22 |
| 5,818,018 A | 10/1998 | Conboy et al. ................ 235/375 |
| 5,838,566 A | 11/1998 | Conboy et al. ........... 364/468.22 |
| 5,859,964 A * | 1/1999 | Wang et al. ............. 395/185.01 |
| 5,904,487 A | 5/1999 | Conboy et al. .................. 438/14 |
| 5,924,833 A | 7/1999 | Conboy et al. ................. 414/217 |
| 5,972,727 A | 10/1999 | Ryan et al. ....................... 438/14 |
| 6,005,281 A | 12/1999 | Conboy et al. ................. 257/531 |
| 6,035,245 A | 3/2000 | Conboy et al. ................. 700/214 |
| 6,108,585 A | 8/2000 | Ryan et al. ...................... 700/112 |
| 6,154,043 A | 11/2000 | Conboy et al. ................. 324/764 |
| 6,157,866 A | 12/2000 | Conboy et al. ................. 700/121 |
| 6,192,287 B1 * | 2/2001 | Solomon et al. ............... 700/110 |
| 6,213,708 B1 | 4/2001 | Allen ............................ 414/627 |
| 6,216,948 B1 | 4/2001 | Conboy et al. ................. 235/383 |
| 6,304,999 B1 | 10/2001 | Toprac et al. ....................... 716/4 |
| 6,308,107 B1 | 10/2001 | Conboy et al. ................. 700/121 |
| 6,338,005 B1 | 1/2002 | Conboy et al. ................. 700/213 |
| 6,351,684 B1 | 2/2002 | Shirley et al. ................. 700/121 |
| 6,356,804 B1 | 3/2002 | Conboy et al. ................. 700/228 |
| 6,392,403 B1 | 5/2002 | Conboy et al. .............. 324/158.1 |
| 6,403,905 B1 | 6/2002 | Conboy et al. ................. 209/563 |

(Continued)

FOREIGN PATENT DOCUMENTS

WO    WO 00/79355 A1    12/2000

(Continued)

OTHER PUBLICATIONS

Hendrix "Triant FDC Broker Driver Top Level Design" Feb. 1, 2002, all pages.

(Continued)

*Primary Examiner* — Michael Nghiem
(74) *Attorney, Agent, or Firm* — Hamilton & Terrile, LLP; Stephen A. Terrile (57) ABSTRACT

A method of brokering information in a manufacturing system which includes a broker coupled between a supplier of information and a consumer of information. The manufacturing system receives information from the supplier in a first format and sends information from the broker to the consumer in a second format.

9 Claims, 5 Drawing Sheets

U.S. PATENT DOCUMENTS

| | | | |
|---|---|---|---|
| 6,411,859 B1 | 6/2002 | Conboy et al. | 700/101 |
| 6,556,881 B1 * | 4/2003 | Miller | 700/108 |
| 6,560,503 B1 * | 5/2003 | Toprac et al. | 700/108 |
| 6,850,811 B1 * | 2/2005 | Stewart | 700/110 |
| 2001/0032174 A1 * | 10/2001 | Yokota | 705/37 |
| 2002/0087229 A1 * | 7/2002 | Pasadyn et al. | 700/121 |
| 2002/0087474 A1 * | 7/2002 | Suga | 705/50 |
| 2002/0103669 A1 * | 8/2002 | Sullivan et al. | 705/1 |

FOREIGN PATENT DOCUMENTS

| | | |
|---|---|---|
| WO | WO 01/18623 A1 | 3/2001 |
| WO | 01/25865 * | 4/2001 |
| WO | WO 01/52320 A2 | 7/2001 |
| WO | WO 01/52320 A3 | 7/2001 |
| WO | WO 02/10873 A2 | 2/2002 |
| WO | WO 02/10873 A3 | 2/2002 |
| WO | WO 03/077049 * | 9/2003 |

OTHER PUBLICATIONS

"Regulations—Governing Semi® Standards Committees" Semiconductor Equipment and Materials International—Revised Jul. 17, 2001, all pages.

"Brooks APC Platform, Factory-Wide Advanced Process Control," Brooks Software, 2005, 2 pages.

"Neural network for fab wide wafer to wafer APC," www.fabtech.org, Oct. 8, 2004, 1 page.

"Production enhancement of Lithography through APC Methods," www.future-fab.com, Feb. 11, 2003, 12 pages.

Gregory A. Cherry et al., "Multivariate Analysis for Semiconductor Fault Detection and Classification and Tool Performance Assessment," AMD Texas-Wisconsin Modeling and Control Consortium, Feb. 9-10, 2004, 22 pages.

* cited by examiner

Figure 5

SYSTEM FOR BROKERING FAULT DETECTION DATA

BACKGROUND OF THE INVENTION

1. Field of the Invention

This invention relates generally to semiconductor manufacturing and more particularly, to brokering fault detection data.

2. Description of the Related Art

Manufacturing processes, particularly semiconductor manufacturing processes, generally include a large number of steps, referred to as process steps. These process steps use a number of inputs that are generally fine-tuned to maintain proper manufacturing control.

The manufacture of semiconductor devices uses the discrete process steps to create a packaged semiconductor device from raw semiconductor material. The various process steps, from the initial growth of the semiconductor material, the slicing of the semiconductor crystal into individual wafers, the fabrication stages (deposition, etching, ion implanting, or the like), to the packaging and final testing of the completed device, are different from one another and specialized, thus the process steps may be performed in different manufacturing areas or locations that contain different control schemes.

Generally, a set of processing steps is performed on a group of semiconductor wafers, sometimes referred to as a lot. For example, a process layer composed of a variety of materials may be formed above a wafer. Thereafter, a patterned layer of photoresist may be formed above a wafer. Thereafter, a patterned layer of photoresist may be formed above the process layer using known photolithography techniques. Typically, an etch process is then performed on the process layer using the patterned layer of photoresist as a mask. This etching process results in formation of various features or objects in the process layer. Such features may be used for a variety of purposes, e.g., in a gate electrode structure for transistors.

The manufacturing tools within a semiconductor manufacturing facility typically communicate with a manufacturing framework or a network of processing modules using a common architecture such as common object request broker architecture (CORBA). Each manufacturing tool is generally coupled to an equipment interface. The equipment interface is coupled to a machine interface to which a manufacturing network is coupled, thereby facilitating communications between the manufacturing tool and the manufacturing framework. The machine interface can be part of an advanced process control (APC) system. The APC system initiates a control script, which can be a software program that automatically retrieves the data needed to execute a manufacturing process.

To decoupled applications from implementation details, CORBA specification defines an Object Request Broker (ORB) interface that provides various helper functions such as converting object references to strings and vice versa, and creating argument lists for requests made through a dynamic invocation interface. The ORB provides a mechanism for transparently communicating client requests to target object implementations. An ORB is a logical entity that may be implemented in various ways such as one or more processes or a set of libraries. The ORB simplifies distributed programming by decoupling the client from the details of the method invocations. Thus, client requests appear to be local procedure calls. When a client invokes an operation, the ORB is responsible for finding the object implementation, transparently activating the implementation if necessary, delivering the request to the object and returning any response to the caller.

Some manufacturing tools may not conform to an architecture such as CORBA. In such cases, it may become important to communicate with devices which conform to the architecture.

SUMMARY OF THE INVENTION

In one embodiment, the invention relates to a method of brokering information in a manufacturing system comprising a broker coupled between a supplier of information and a consumer of information. The manufacturing system receives information from the supplier in a first format and sends information from the broker to the consumer in a second format.

In another embodiment, the invention relates to a method of brokering fault detection and classification data in a manufacturing system which comprises providing a broker coupled between a supplier of fault detection and classification data and a consumer of fault detection and classification data. The manufacturing system receives fault detection and classification data from the supplier in a first format and sends fault detection and classification data from the broker to the consumer in a second format.

In another embodiment, the invention relates to a manufacturing system which comprises a supplier of fault detection and classification data, a consumer of fault detection and classification data and a broker. The broker is coupled between the supplier and the consumer. The broker includes a supplier portion that is coupled to the supplier and a consumer portion that is coupled to a consumer. The supplier portion receives the fault detection and classification data from the supplier. The consumer portion supplies alarms to the consumer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
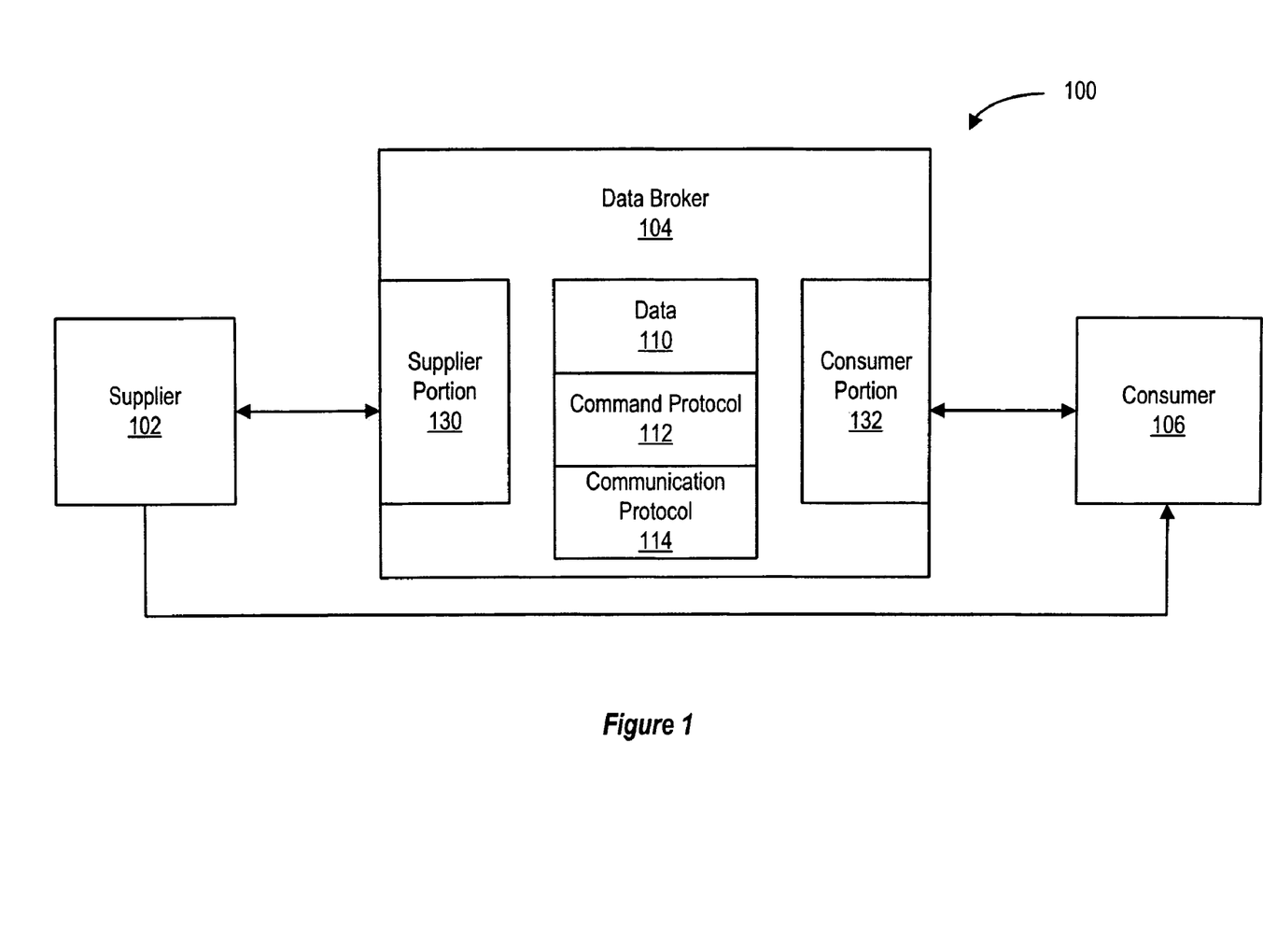
FIG. 1 shows a block diagram of a semiconductor manufacturing system in accordance with the invention.

Referring to FIG. 1, a block diagram of a semiconductor manufacturing system 100. Semiconductor manufacturing system 100 includes a broker 104 and a customer 106. The broker 104 provides the interface between a supplier 102 such as a fault detection and classification (FDC) broker architecture and a customer 106 such as an FDC analysis engine. The broker 104 includes at least one of a plurality of characteristics. More specifically, the broker 104 includes a network transport independence characteristic, a high capacity, moderate latency characteristic, a communication protocol independence characteristic, and a synchronous and asynchronous data exchange characteristic.

The network transport independence characteristic allows the broker 104 to provide communication protocol independence and thus supports a plurality of protocols. Several of the protocols used by semiconductor manufacturing systems, such as CORBA and SOAP, specify network transport independence in their respective specifications. The TCP/IP protocol is also a desirable protocol because several of the vendors supplying the communication protocol interfaces support TCP/IP.

The broker 104 supports several hundred sensors at a minimum sample rate of, e.g., 50 ms. The semiconductor manufacturing system 100 provides a communication rate of 600-800 kB/sec with a latency of 5 ms. Accordingly each sensor could send 3-4 kB/sec of data.

The broker 104 includes three layers, a data layer 110, a command protocol layer 112 and a communication protocol layer 114. The communication protocol layer may change protocols if so desired.

The broker 104 consumes both synchronous and asynchronous messages. The consumer 106 registers with the broker 104 for the types of data that the consumer 106 wants, such as tool source, but may not be able to specify sample rate. The default sample rate is determined by the supplier 102 at runtime and the supplier 102 has the option of ignoring requests for different sample rates.

For asynchronous data, the supplier 102, such as an equipment interface, sends the data as determined by the remote supplier at runtime. The data is sent as a remote procedure call on the consumer 106 from the supplier 102 (using the communication protocol layer 114), and the consumer 106 returns a Boolean value representing a successful transmission. Synchronous data is requested via the broker 104. Consumers 106 do not need to know anything about the supplier 102, so all synchronous data requests are sent via the broker 104. Additionally, the consumer 106 cannot request synchronous data that does not match the registered filter of the consumer 106. This limitation thus limits the network traffic and the broker 104 complexity. For example, if a consumer 106 is registered to receive data from Tool X, the consumer cannot request the sample plan for Tool Y.

The broker 104 includes both a supplier portion 130 and a consumer portion 132. The consumer portion 132 supplies alarms to consumers, such as the equipment interface (EI). The supplier portion 130 receives synchronous and asynchronous messages from one or more suppliers.

The command protocol layer 112 supports a plurality of commands. The commands supported by the command protocol layer include a list plans command, an export plan command, an import plan command, an enable/disable plan command, a start/stop command, a list available sensors command, an external event command, a delete plan command, a subscribe to plans command and a ping command.

The list plans commands returns all the available data collection plans for a given tool, their versions, and their current state (enabled or disabled, active or idle). The export plan command returns the details of the plan. The import plan command accepts a plan created by an application or from another similar tool (enables the copying of data collection plans from tool to tool or chamber to chamber). The enable/disable plan command accepts input to enable or disable a plan; logic for when to invoke a plan is not evaluated for disabled plans. With the start/stop command, events external to the data server can be used to trigger the start or stop of a particular plan. A plan may need to be configured to accept these events i.e., the logic of the plan looks for these events.

The list available sensors command returns a list of sensors available from the tool. Sensor alias objects are presented as opposed to Status Variable Identifiers (SVID's). Thus third party clients can define their own collection plans. The external event command accepts a self-defining external event that for example could be used to enable or disable a data collection plan or could be used to modify the collection rate logic. The delete plan command accepts a command to delete a disabled plan. With the subscribe to plan(s) command, a supplier accepts a request from a remote consumer to receive data when a plan is collecting data. Multiple consumers are able to subscribe to the same plan. With the ping command a supplier can determine if the other side of the connection is alive and well (and possibly determine the network latency between the applications).

The data layer 110 includes a data schema. The data schema of the data layer 100 represents sensor data, events (such as tool events, tool alarms, analysis engine alarms or custom events), data collection plans, and configuration information. The data schema and the command protocol layer 112 are extensible.

Data collection plans are implemented into the consumer 106 using one of two methods, filterable headers that are set during registration with the broker 104 and synchronous messages. Multiple consumers are registered with multiple data collection plans. If at any time, a different data collection plan is used for a consumer 106, the consumer 106 un-registers itself, changes plans, and then re-registers itself with the broker 104. Preferably, the re-registration process takes no loner than the minimum sample rate.

A named data collection plan includes a list of sensors to collect (sent in the filterable header), a frequency at which to collect the sensor data (sent via a synchronous message), conditional rules which the supplier 102 may determine how to send asynchronous data, and version information for history and change control.

To reduce supplier complexity, collection plans are not changed on the fly. However, there are a plurality of procedures by which the collection plan may be changed. For example, the broker 104 may register several consumers with different conditional rules. The broker 104 may un-register a consumer and then re-register the consumer with a different plan. The broker 104 may create a consumer with a specific plan, then register the consumer when the broker desires to activate the plan and un-register the plan when no longer needed.

Figure 2:
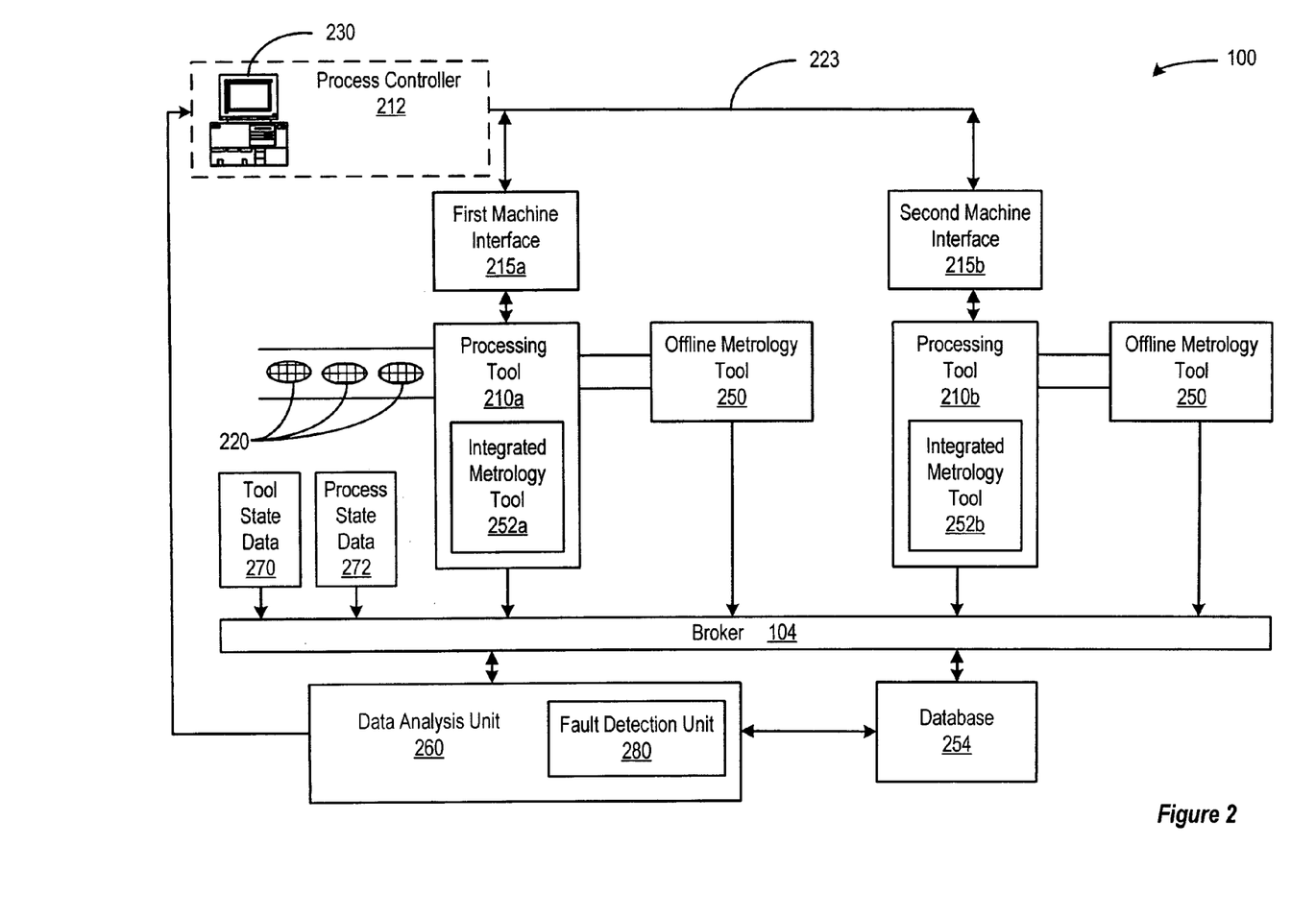
FIG. 2 shows a block diagram of a semiconductor manufacturing system.

Referring to FIG. 2, a block diagram of a system 100 in accordance with the present invention is shown. Semiconductor wafers 220 are processed on processing tools 210a, 210b using a plurality of control input signals, or manufacturing parameters, provided via a network 223. Control input signals, or manufacturing parameters sent to the processing tools 210a, 210b from a computer system 230 via machine interfaces 215a, 215b. The first and second machine interfaces 215a, 215b are located outside the processing tools 210a, 210b. In an alternative embodiment, the first and second machine interfaces 215a, 215b are located within the processing tools 210a, 210b. The semiconductor wafers 220 are provided to and carried from a plurality of processing tools 210. The semiconductor wafers 220 may be provided to the processing tool 210 in an automatic fashion (e.g., robotic movement of semiconductor wafer 220). In one embodiment, a plurality of semiconductor wafers 220 are transported in lots (e.g., stacked in cassettes) to the processing tools 210.

The process controller 212 sends control input signals, or manufacturing parameters, on the line 223 to the first and second machine interfaces 215a, 215b. The process controller 212 controls processing operations. The process controller 212 employs a manufacturing model to generate control input signals on the line 223. The manufacturing model contains a manufacturing recipe that determines a plurality of control input parameters that are sent on the line 223 to the processing tools 210a, 210b.

The manufacturing model defines a process script and input control that implement a particular manufacturing process. The control input signals (or control input parameters) on the line 223 that are intended for processing tool "A" 210a are received and processed by the first machine interface 215a. The control input signals on the line 223 that are intended for processing tool "B" 210b are received and processed by the second machine 215b. Examples of the processing tools 210a, 210b used in semiconductor manufacturing processes are steppers, etch process tools, deposition tools, and the like.

One or more of the semiconductor wafers 220 that are processed by the processing tools 210a, 210b can also be sent to an offline metrology tool 250 for acquisition of metrology data. The offline metrology tool 250 can be an optical data acquisition tool, an overlay-error measurement tool, a critical dimension measurement tool, and the like. In one embodiment, one or more processed semiconductor wafers 220 are examined by an offline metrology tool 250. Furthermore, metrology data may also be collected by the integrated metrology tool 252 within the processing tools 210a, 210b.

Data from the integrated metrology tool 252 and the offline metrology tool 250 may be collected by the data analysis unit 260. The metrology data is directed to a variety of physical or electrical characteristics of the devices formed on the wafers 220. For example, metrology data may be obtained as to line width measurements, depth of trenches, sidewall angles, thickness, resistance, and the like. As described above, the data analysis unit 260 organizes, analyzes, and correlates data acquired by the metrology tools 250, 252 to particular semiconductor wafers 220 that were examined.

The data analysis 260 sends data (including inline-type metrology data) and offline metrology data, from the integrated metrology tool 252 and offline metrology tool 250, respectively, to the database 254 for storage and/or access for analysis. The database 254 receives data, which includes offline and integrated data, as well as other data such as tool state data 270 and process state data 272. The database 254 may correlate the data with corresponding tool state data and/or process state data, thereby expanding and/or contracting the data for fault detection analysis. The database 254 may also send and receive data via the broker 104.

Data from the database 254 may be extracted by a data analysis unit 260 for performing fault detection analysis based upon data from the database 254. The fault detection unit 280 provides fault detection data to the process controller 212, which may use the fault detection data/analysis to improve the operation of the semiconductor wafer 220 manufacture processes. The data analysis unit 260 may be a software function, a hardware circuit and/or a firmware component of a standalone unit or unit(s) integrated into a computer system.

Figure 3:
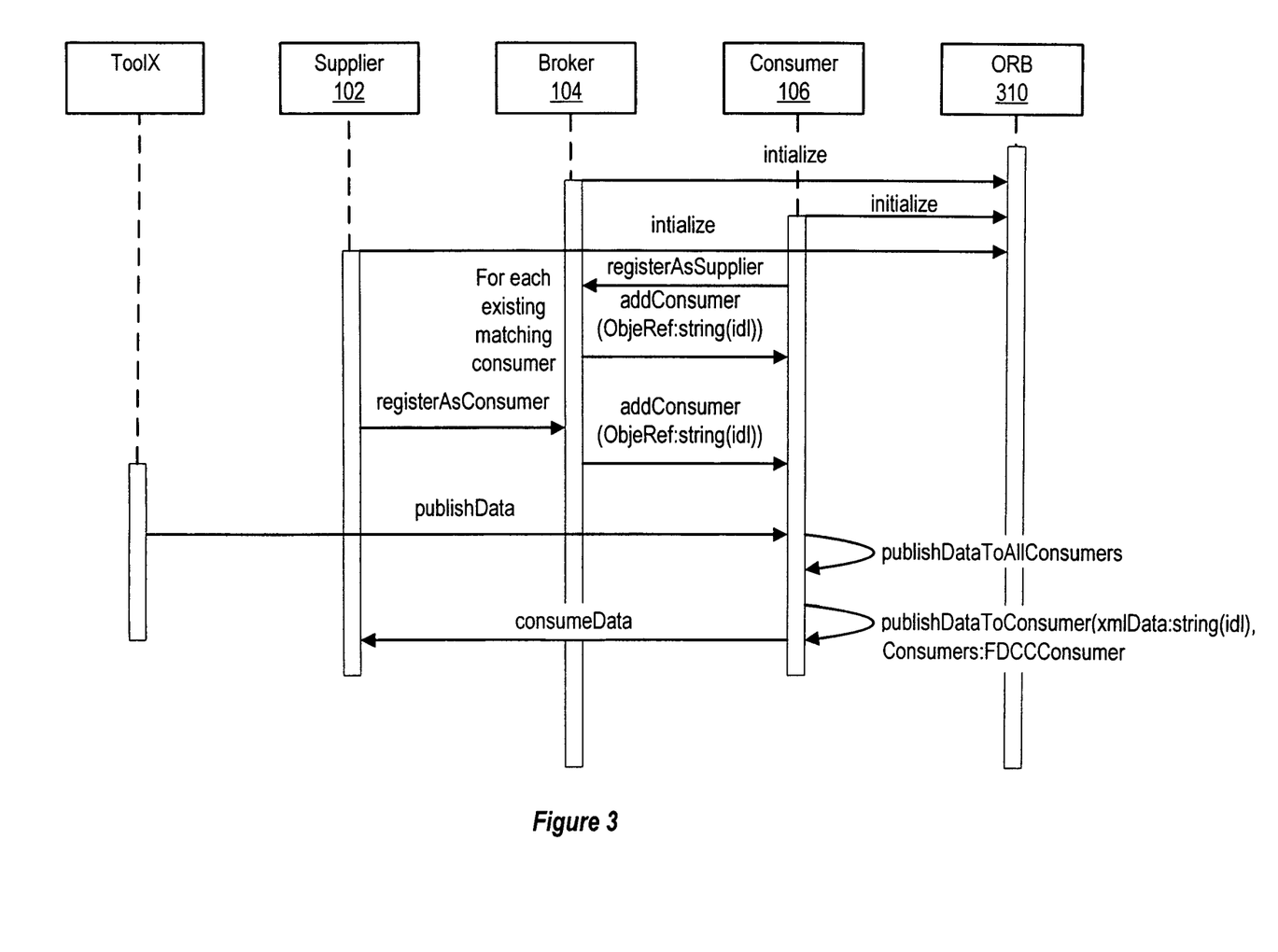
FIG. 3 shows a flow diagram of the operation of a system using a broker.

Referring to FIG. 3, when the system starts, the broker 104 initializes with the ORB 310, which in one embodiment is an Orbix type ORB. After the broker initializes with the ORB, the supplier 102 initializes with the ORB. After the supplier initializes with the ORB 310, then the client (i.e., the consumer) initializes with the ORB 310.

After the broker 104, the supplier 102 and the consumer 106 initialize with the ORB, then the supplier 102 registers with the broker 104 as a supplier 102 using a RegisterAsSupplier call. When the supplier 102 registers with the broker 104, then for each existing matching consumer 106, the broker 104 provides the consumer information to the supplier via an addConsumer call. The addConsumer call provides an attribute via an idl string. (e.g., ObjeRef:string(idl)). The broker 104 provides this information to the supplier because there may be consumers 106 already registers with the broker 104.

After the broker 104 provides the consumer information to the supplier 102, the consumer 106 registers with the broker 104 as a consumer. The broker 104 then informs the supplier 102 of the newly registered consumer 106 via an addConsumer call.

After the registration process, tools publish data to the supplier via the broker 104 using a publishDataToAllConsumers command using an xml data string. Additionally, consumers 106 may consume data from suppliers 102 via a publishDataToConsumer command using an xml data string.

Figure 4:
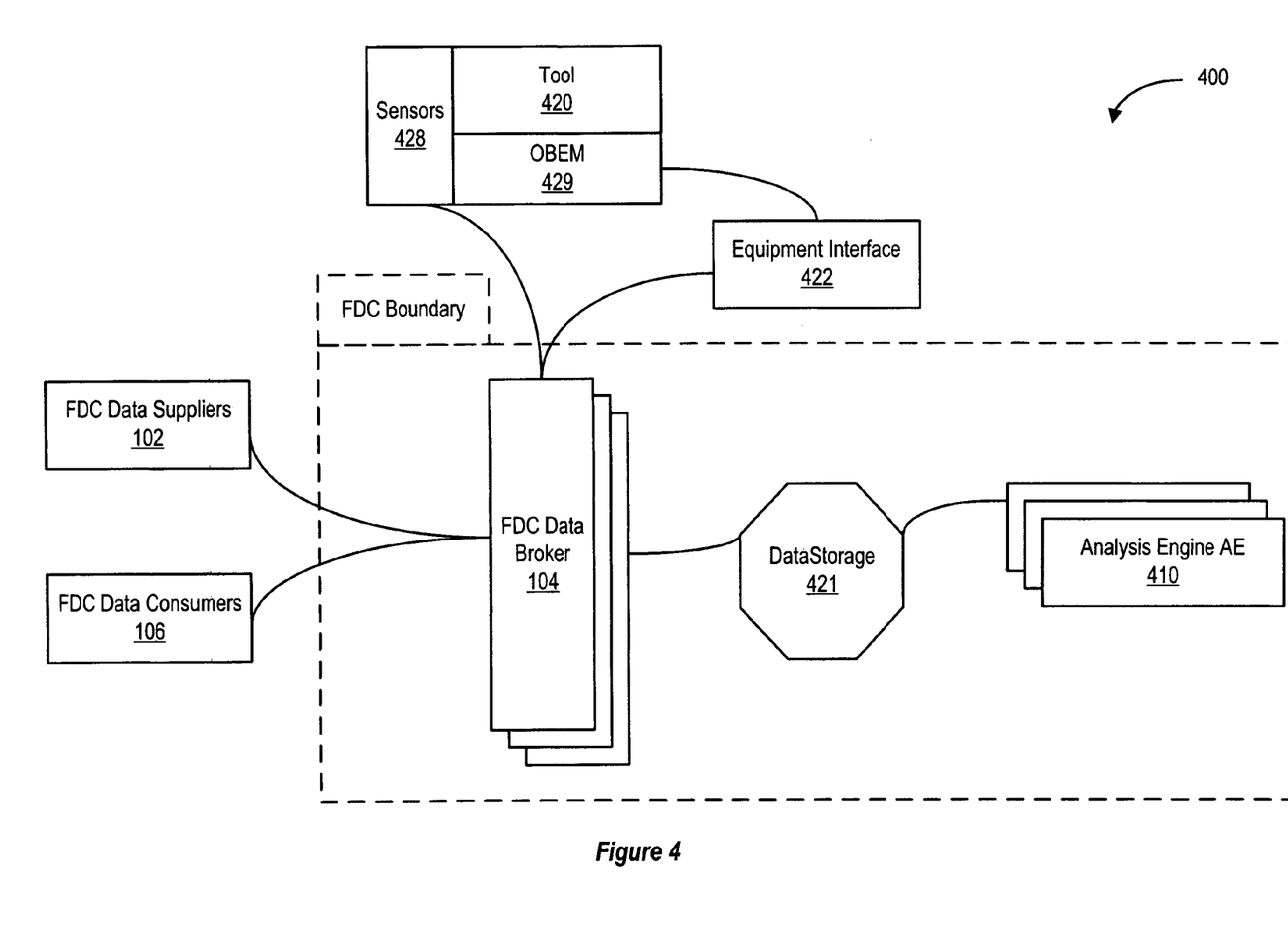
FIG. 4 shows a block diagram of a fault detection and classification system using a broker.

Referring to FIG. 4, FDC system 400 uses broker 104 to provide an interface between the various data suppliers 102, data consumers 106 and the analysis engine 410. The FDC system 400 includes FDC data suppliers 102, FDC data consumers 106, data storage 421 and an analysis engine 410, as well as tool 420 and equipment interface 422. Tool 420 includes, e.g., sensors 428 and object based equipment model (OBEM) 429. Each of the portions of the FDC system 400 interact with the data storage 421 of the FDC system 400 via the FDC data broker 104.

Other Embodiments

Other embodiments are within the following claims.

Figure 5:
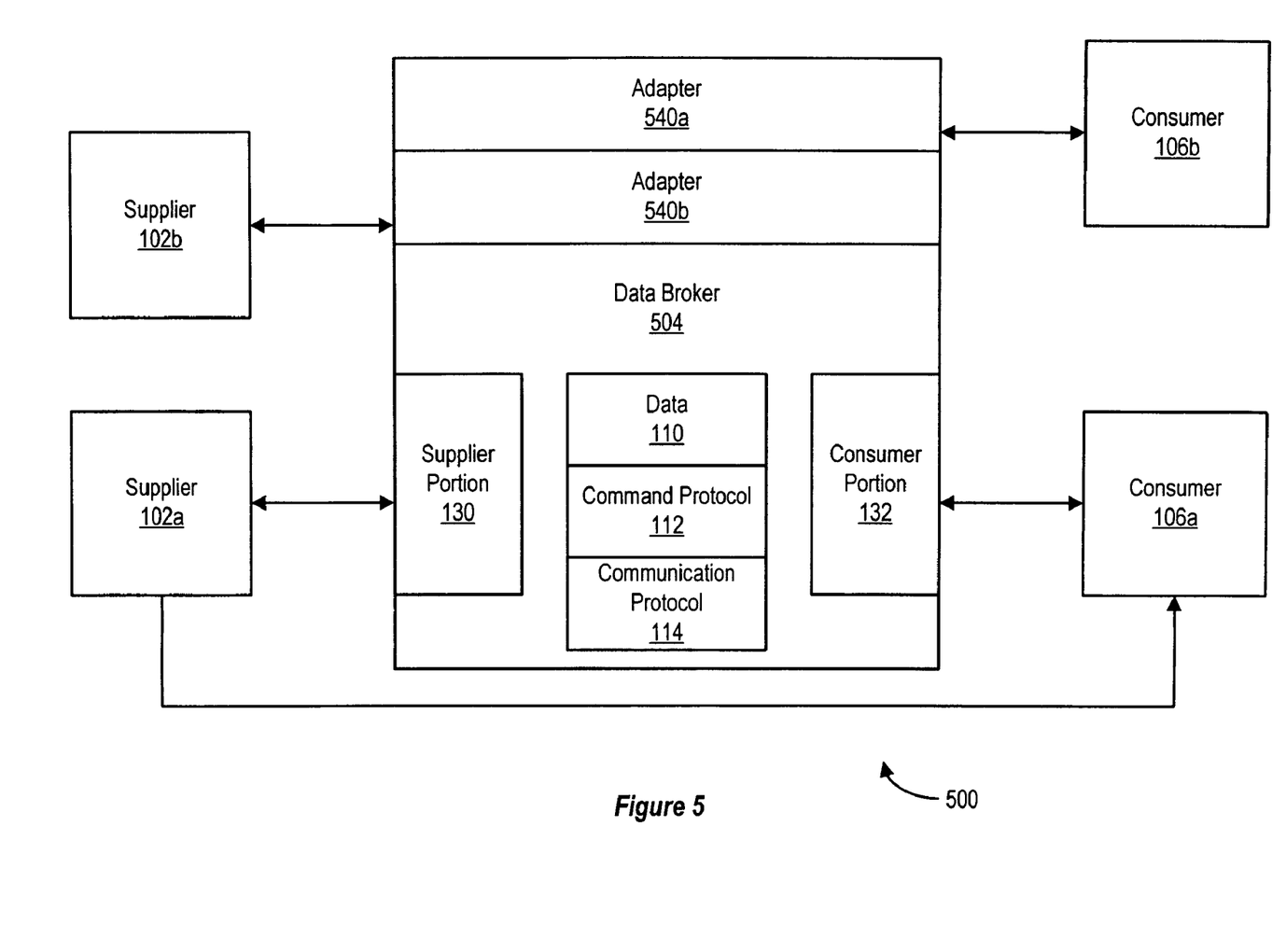
FIG. 5 shows a block diagram of an alternate semiconductor manufacturing system using a broker.

For example, FIG. 5 shows a block diagram of an alternate system 500 including a broker 504. In system 500, the supplier 102a and the consumer 106a conform to and communicate via a CORBA protocol. Adapters 540a, 540b allow the broker 504 to accommodate any protocol. These adapters 540a, 540b may be added to a compiled or run-time version of the broker 504. This system allows additional protocols to be added to the broker 504 after the initial deployment of the broker 504.

Examples of existing protocols that might be accommodated via an adapter 540a, 540b include the simple object access protocol (SOAP), the MQ Series protocol from IBM and the HyperText Transport Protocol HTTP protocol. Accordingly, the broker 504 not only accommodates existing protocols but provides the ability to accommodate additional protocols.

Also, for example, add-on tool sensors such as chemical concentration or particle sensors may also register as suppliers.

What is claimed is:
1. A method of brokering fault detection and classification data in a manufacturing system comprising:
    providing a broker in a computer system coupled between a supplier of the fault detection and classification data and a consumer of the fault detection and classification data, the fault detection and classification data applying to data relating to detection and classification of excursions that occur during a manufacturing process;
    receiving the fault detection and classification data from the supplier in a first format; and,
    sending the fault detection and classification data from the broker to the consumer in a second format; wherein
    the consumer registers with the broker for types of information that the consumer wants to receive.

2. The method of brokering information of claim 1 wherein the broker consumes both synchronous and asynchronous information.

3. A manufacturing system comprising:
- a supplier of fault detection and classification data, the fault detection and classification data applying to data relating to detection and classification of excursions that occur during a manufacturing process;
- a consumer of the fault detection and classification data; and
- a broker in a computer system coupled between the supplier and the consumer, the broker including a supplier portion coupled to the supplier and a consumer portion coupled to a consumer, the supplier portion receiving the fault detection and classification data from the supplier, the consumer portion supplying alarms to the consumer, the consumer registering with the broker for types of information that the consumer wants to receive via the consumer portion.

4. The manufacturing system of claim 3 wherein the broker further comprises:
- a data layer, the data layer including a data schema.

5. The manufacturing system of claim 4 wherein the data schema represents at least one of sensor data, events, data collection plans and configuration information.

6. The manufacturing system of claim 5 wherein the events include at least one of tool events, tool alarms and custom events.

7. The manufacturing system of claim 3 wherein the broker further comprises:
- a command protocol layer, the command protocol layer supporting a plurality of commands.

8. The manufacturing system of claim 7 wherein the plurality of commands include at least one of a list plans command, an export plan command, an import plan command, an enable/disable plan command, a start/stop command, a list available sensors command, an external event command, a delete plan command, a subscribe to plans command and a ping command.

9. The manufacturing system of claim 3 wherein
- the manufacturing system manufactures semiconductor material; and,
- a process for manufacturing the semiconductor material is modified based upon communications with the broker.

* * * * *